(12) United States Patent
Chen et al.

(10) Patent No.: US 11,549,539 B2
(45) Date of Patent: Jan. 10, 2023

(54) REDUCED RING GROOVE RIVET

(71) Applicants: RODEX FASTENERS CORP., Taoyuan (TW); GOEBEL INNOVATIVE ENTREPRENEURIAL COMPANY (LIMITED LIABILITY), Ratingen (DE)

(72) Inventors: Wen-Pin Chen, Taoyuan (TW); Domingo Jr. Magora Saquing, Taoyuan (TW)

(73) Assignees: Rodex Fasteners Corp., Taoyuan (TW); Goebel Innovative Entrepreneurial Company, Ratingen (DE)

( * ) Notice: Subject to any disclaimer, the term of this patent is extended or adjusted under 35 U.S.C. 154(b) by 369 days.

(21) Appl. No.: 16/824,786

(22) Filed: Mar. 20, 2020

(65) Prior Publication Data
US 2021/0293266 A1    Sep. 23, 2021

(51) Int. Cl.
*F16B 19/05* (2006.01)
(52) U.S. Cl.
CPC .................. *F16B 19/05* (2013.01)
(58) Field of Classification Search
CPC ....................................................... F16B 19/05
USPC ........................................................ 411/361
See application file for complete search history.

(56) References Cited

U.S. PATENT DOCUMENTS

| | | | | |
|---|---|---|---|---|
| 2,396,661 | A * | 3/1946 | Keller | F16B 19/05 72/352 |
| 2,955,505 | A * | 10/1960 | Schuster | F16B 19/05 29/520 |
| 3,915,053 | A * | 10/1975 | Ruhl | F16B 19/05 411/361 |
| 4,233,878 | A * | 11/1980 | McGauran | F16B 5/0642 411/510 |
| 4,254,809 | A * | 3/1981 | Schuster | F16B 19/05 411/277 |
| 4,653,969 | A * | 3/1987 | Summerlin | F16B 19/05 411/361 |
| 5,314,281 | A * | 5/1994 | Turlach | F16B 19/05 411/361 |
| 5,527,140 | A * | 6/1996 | Mages | F16B 19/05 411/360 |
| 7,891,924 | B2 * | 2/2011 | Mercer | B21J 15/022 411/361 |
| 9,194,412 | B2 * | 11/2015 | Haines, Jr. | F16B 19/05 |

* cited by examiner

*Primary Examiner* — Flemming Saether
(74) *Attorney, Agent, or Firm* — Rosenberg, Klein & Lee

(57) ABSTRACT

A reduced ring groove rivet at least includes a pin having a head and a body connected to the head; a plurality of sets of ring grooves are equidistantly arranged on the body, and each of the sets of ring grooves includes a first ring groove and a second ring groove adjacent to the first ring groove, wherein the first ring groove has a first groove bottom and a first groove peak adjacent to the first groove bottom, and the second ring groove has a second groove bottom and a second groove peak adjacent to the second groove bottom; a diameter of the second groove bottom is smaller than a diameter of the first groove bottom, or a diameter of the second groove peak is smaller than that of the first groove peak, so that any of the plurality of sets of ring grooves can be breaking part during operation.

10 Claims, 7 Drawing Sheets

REDUCED RING GROOVE RIVET

BACKGROUND OF THE INVENTION

Field of the Invention

The creation relates to a structure technology of fixed member, in particular, to a reduced ring groove rivet.

Description of the Prior Art

The implementation of ring groove rivets is mainly divided into two categories, one is a traditional ring groove rivet, and the other is a ring groove rivet with a broken neck groove.

As shown in FIGS. 1 and 2, the conventional ring groove rivet includes a pin 10 and a collar 20 passing through the pin 10. The pin 10 has a head 11 and a body 12 connected to the head 11. The body 12 is provided with a plurality of ring grooves 121. After the body 12 passes through a plurality of workpieces 100, the collar 20 is threaded over the protrusion of the body 12, and the back of the body 12 is pulled through a tool 200 and the collar 20 is pushed, so that the collar 20 protrudes into each of the ring grooves 121 adjacent to its position for engagement and fixing after being deformed (swaging process), and the head 11 and the collar 20 can tightly clamp the plurality of workpieces 100 therebetween after the body 12 is pulled to be fractured and removed behind, thereby completing the riveting cooperation. Ideally, the breaking part 13 will be generated near the end of the collar 20, but the shape of the breaking part 13 is often not as expected, as shown in FIG. 2. When the breaking part 13 has a large inclination, it is easy to cause the collar 20 to be incompletely engaged and affect the riveting effect, and the sharpness thereby may cause danger.

As shown in FIGS. 3 and 4, the conventional ring groove rivet with a broken neck groove is different from the aforementioned traditional ring groove rivet in that the body 12 has a front section near the head 11 provided with a plurality of ring grooves 121, a middle section provided with a broken neck groove 122, and a rear section being a pintail 123. After the body 12 passes through a plurality of workpieces 100, the collar 20 is threaded over the protrusion of the body 12, and the pintail 123 is torn through the tool 200 and the collar 20 is pushed, so that the collar 20 protrudes into each of the ring grooves 121 adjacent to its position for engagement and fixing after being deformed (swaging process), and the head 11 and the collar 20 can tightly clamp the plurality of workpieces 100 therebetween after the excessive pintail 123 is pulled to be fractured and removed, thereby completing the riveting cooperation.

Since the broken neck groove 122 is to make the ring groove rivet easier to be broken, a diameter of the broken neck groove 122 must be smaller than a diameter of the ring groove 121, so that the breaking part 13 when the pin 10 is fractured is located in the broken neck groove 122 to control the position and fracture condition of the breaking part 13, thereby preventing the occurrence of breaking part 13 exhibiting a large inclination. However, this design will cause the distance between the breaking part 13 and the head 11 to be fixed. When the thickness of the workpieces is insufficient upon overlapping the workpieces 100, the breaking part 13 will obviously protrude from the collar 20 and there is a danger of work safety, as shown in FIG. 2; in contrast, when the thickness of the plurality of workpieces exceeds that of the broken neck groove upon overlapping the workpieces 100, the breaking part 13 may be excessively submerged into the collar 20 (not shown in the figure), so that the amount of the protrusion of the collar 20 into the ring groove 121 after the deformation of the collar 20 is insufficient, resulting in poor engaging force and affecting the quality of the project.

Further, as shown in FIG. 5, whether it is a traditional ring groove rivet or a ring groove rivet with a broken neck groove, the problem of insufficient engaging force and affecting the engineering quality will also be caused since an inner wall of the collar 20 cannot always sufficiently protrude deeply into the ring groove 121 during implementation.

In view of the problems in the prior art, the inventor has improved the ring groove rivet.

SUMMARY OF THE INVENTION

This creation mainly aims at providing a reduced ring groove rivet for workpieces with different thicknesses. To achieve above the purpose, a reduced ring groove rivet of the disclosure at least includes a pin having a head and a body connected to the head; a plurality of sets of ring grooves are equidistantly arranged on the body, and each of the above sets of ring grooves includes a first ring groove and a second ring groove adjacent to the first ring groove, wherein the first ring groove has a first groove bottom and a first groove peak adjacent to the first groove bottom, and the second ring groove has a second groove bottom and a second groove peak adjacent to the second groove bottom; a diameter of the second groove bottom is smaller than a diameter of the first groove bottom, so that any of the plurality of sets of ring grooves may be selected as a breaking part during the break-off operation. The mainly principle is to use a structure of the second groove bottom having a diameter smaller than a diameter of the first groove bottom for forming a plurality of possible structural weaknesses in the body, so that any one of the plurality of sets of ring grooves may be selected as a breaking part during the break-off operation.

In an embodiment of the present invention, the diameter of the second groove peak is larger than the diameter of the first groove peak.

In an embodiment of the present invention, the pin and the collar comprise austenitic stainless steel.

During implementation, the reduced ring groove rivet further includes a collar, wherein the collar is provided with a through-hole to be sleeved on the body, the collar has a hardness smaller than the pin and having an engagement region, and the engagement region protrudes into each of the sets of ring grooves adjacent to its position after being deformed to engage the body.

During implementation, the engagement region is provided with a recess portion, and the recess portion is arranged on an outer wall of the collar in a ring shape; the recess portion may reduce the deformation resistance of the collar, so that when the engagement region is deformed, it may protrude deeper into the ring groove and present a better engaging effect.

During implementation, the engagement region is provided with a plurality of recess portions, and the plurality of recess portions is arranged in rows on an inner wall of the collar; the recess portion may reduce the deformation resistance of the collar, so that when the engagement region is deformed, it may protrude deeper into the ring groove and present a better engaging effect.

Compared with the prior art, the reduced ring groove rivet provided by the technical solution of the disclosure may select one of the plurality of sets of ring grooves as a breaking part during the break-off operation for being applied to various thicknesses of the workpieces, and may effectively limit the generation range of the breaking part, so that the problem of the breaking part being too protruding or stuck may not be caused, and the provision of a broken neck groove may not be required as in the prior art. Moreover, further providing a recess portion in the engagement region of the collar may make the engagement region present a better engaging effect, and improve the use effect of the reduced ring groove rivet. Besides, stainless steel is a ductile material. Although stainless steel can provide better structural strength, the stainless steel is not easily broken off. When the pin and the collar are made of austenitic stainless steel, the present invention can guarantee to successfully and correctly perform the break-off operation.

DESCRIPTION OF THE PREFERRED EMBODIMENTS

Figure 1:
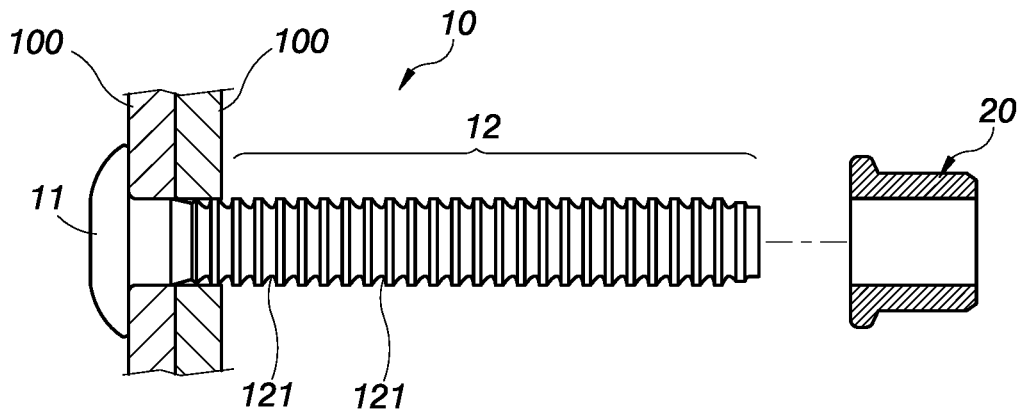
FIG. 1 is a view of a traditional ring groove rivet.
Figure 2:
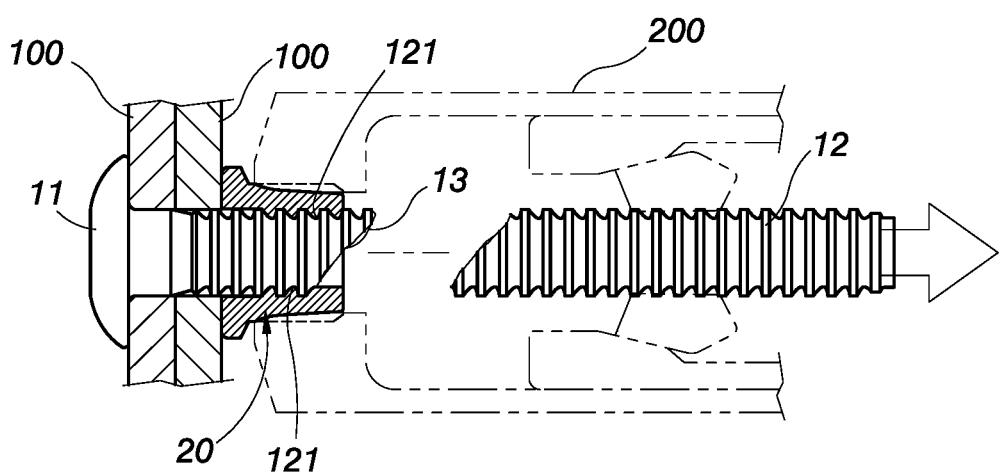
FIG. 2 is a view showing a breaking state of a traditional ring groove rivet.
Figure 3:
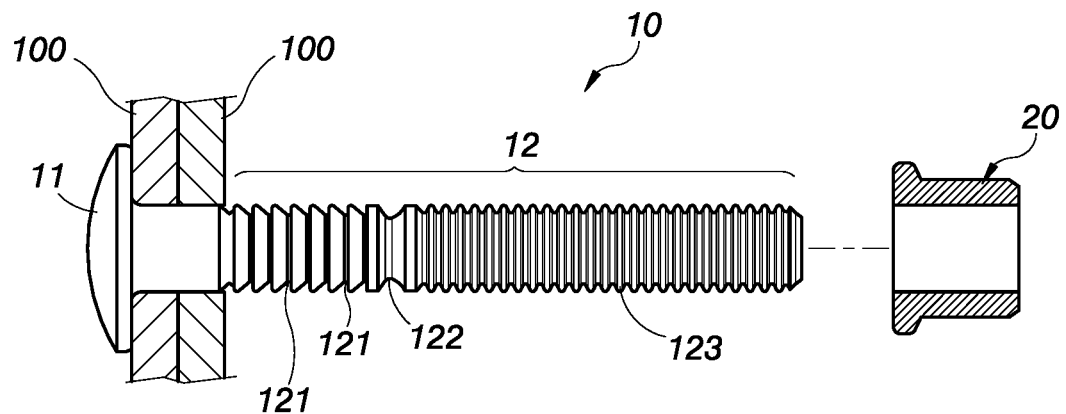
FIG. 3 is a view of a traditional ring groove rivet with a broken neck groove.
Figure 4:
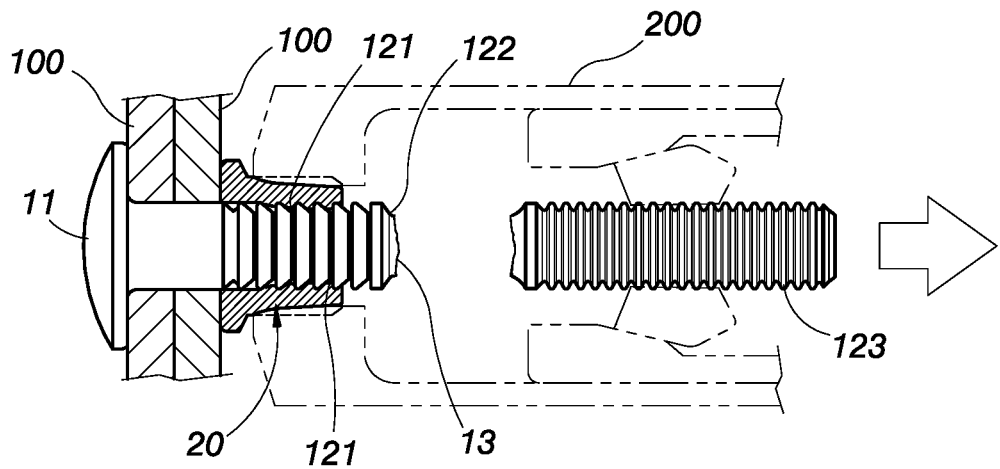
FIG. 4 is a view showing a breaking-off state of a traditional ring groove rivet with a broken neck groove.
Figure 5:
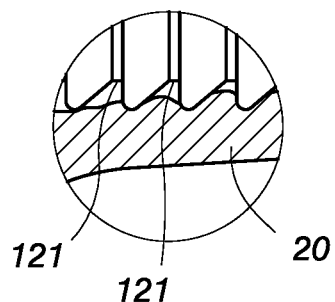
FIG. 5 is a view showing engagement and fixation of a traditional ring groove rivet.
Figure 6:
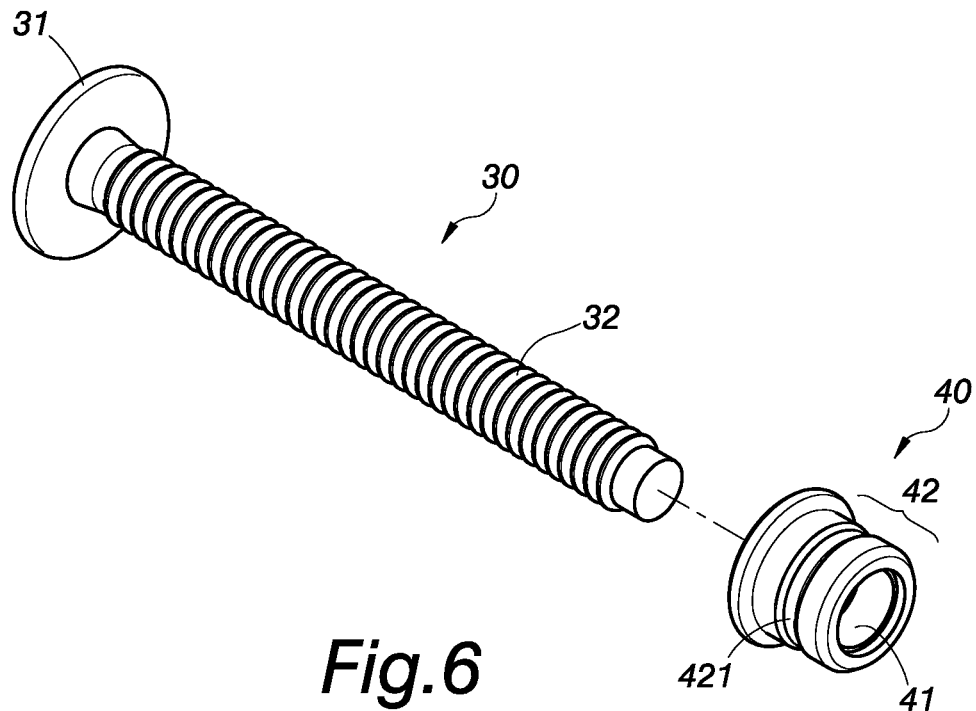
FIG. 6 is an exploded perspective view of a first embodiment of the disclosure.
Figure 7:
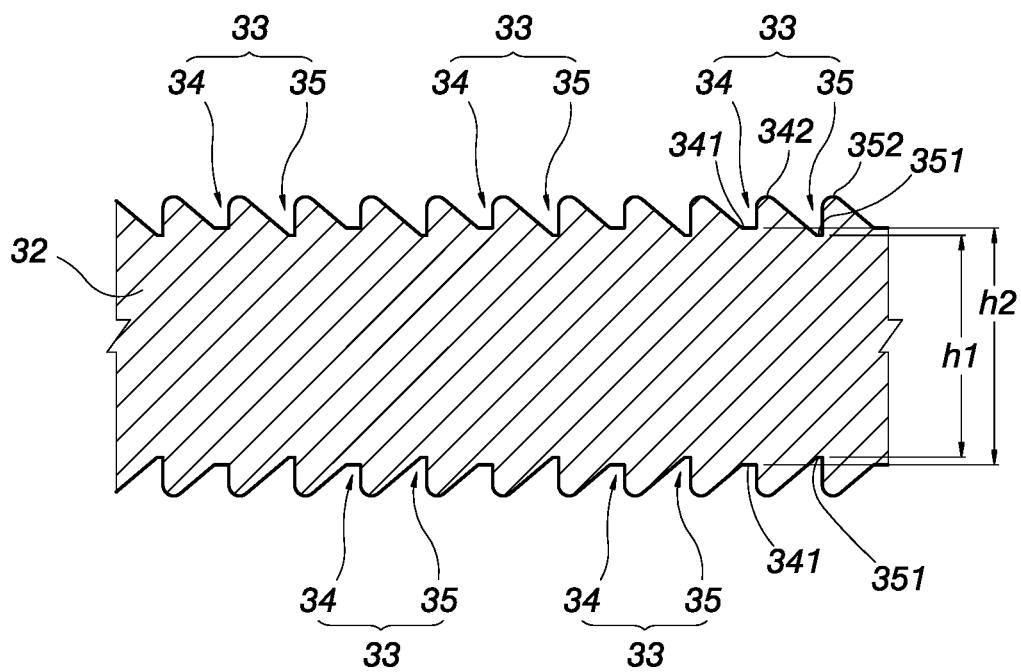
FIG. 7 is an enlarged cross-section view of a pin of a first embodiment of the disclosure.
Figure 8:
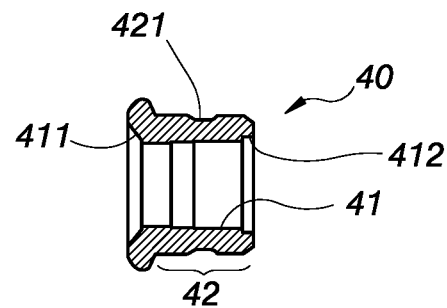
FIG. 8 is a cross-section view of a collar of a first embodiment of the disclosure.
Figure 9:
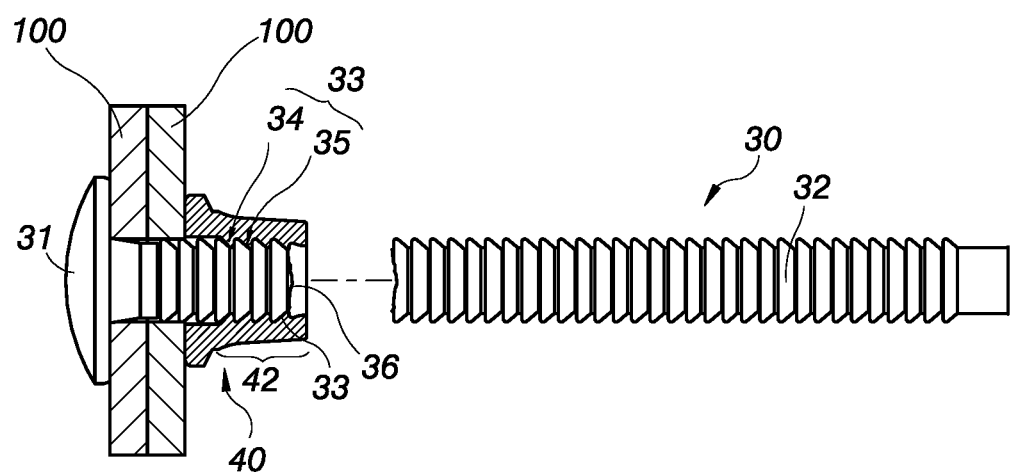
FIG. 9 is a view showing the breaking-off state of a first embodiment of the disclosure.

With reference to FIGS. 6 to 9, a reduced ring groove rivet of a first embodiment of the disclosure includes a pin 30 and a collar 40. The pin 30 and the collar 40 comprise austenitic stainless steel.

The pin 30 has a head 31, and a body 32 connected to the head. A plurality of sets of ring grooves 33 are equidistantly arranged on the body 32, and each of the above sets of ring grooves 33 includes a first ring groove 34 and a second ring groove 35 adjacent to the first ring groove, wherein the first ring groove 34 has a first groove bottom 341 and a first groove peak 342 adjacent to the first groove bottom 341, and the second ring groove 35 has a second groove bottom 351 and a second groove peak 352 adjacent to the second groove bottom 351; a diameter h1 of the second groove bottom 351 is smaller than a diameter h2 of the first groove bottom 341, so that any set of ring grooves 33 of the plurality of sets of ring grooves 33 forms a structural strong point and a structural weak point, and form an interval arrangement of structural strong points and structural weak points on the entire body 32, causing each of the structural weak points arranged at intervals to be a breaking part 36 during the break-off operation; the diameter h1 and the diameter h2 may be a difference in size that may be recognized by the naked eye, or a size difference that is unintentionally observed by the naked eye, such as a difference of 0.3 mm to 0.03 mm, and the foregoing difference values in size are for illustration purposes only and are not intended to limit the disclosure.

The collar 40 is provided with a through-hole 41 to be sleeved on the body 32, the collar 40 has a hardness smaller than the pin 30 and having an engagement region 42. During implementation, the collar 40 is sleeved to the body 32 after the body 32 passes through a plurality of workpieces 100, and the engagement region 42 protrudes into each of the sets of ring grooves 33 adjacent to its position after being deformed, so as to engage the body 32. The engagement region 42 is provided with a recess portion 421, and the recess portion 421 may reduce the deformation resistance of the collar, so that when the engagement region 42 is deformed, it may protrude deeper into the ring groove 33 and present a better engaging effect. In the present embodiment, the recess portion 421 is provided on an outer wall of the collar 40, and the recess portion 421 is in a ring shape. Both ports of the through-hole 41 are provided with a chamfer portion 411 and a counterbore portion, respectively. During implementation, the larger chamfer portion 411 may facilitate the operation in sleeving the collar, and the provision of the counterbore portion 412 may facilitate the formation of the position where the breaking part is formed within the though-hole 41.

Figure 10:
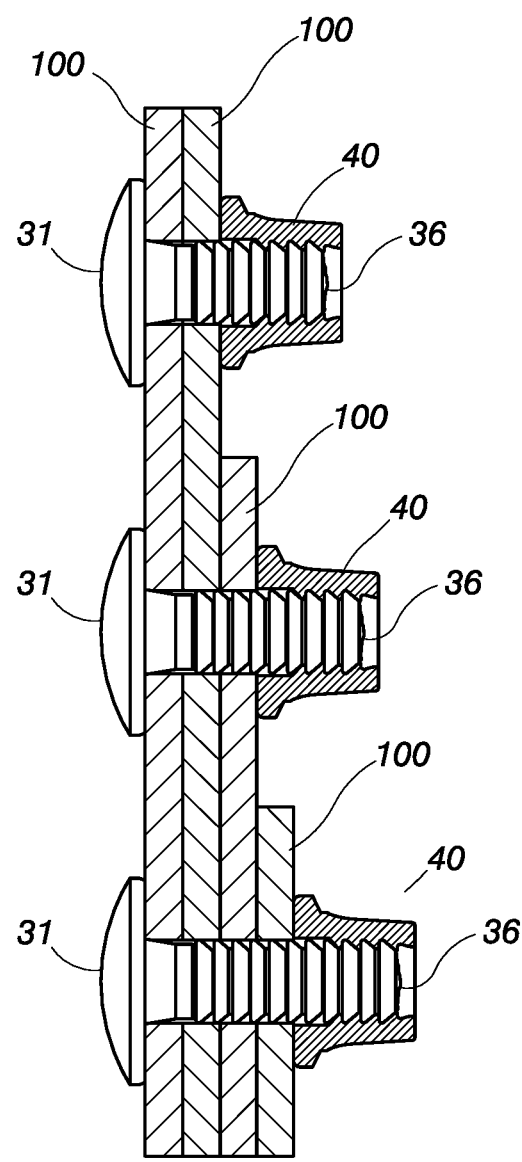
FIG. 10 is a view showing a state where a first embodiment of the disclosure is applied to various workpieces with different thicknesses.

With reference to FIG. 10, since the plurality of sets of ring grooves 33 may be a breaking part 36 during the break-off operation, they may be applied to various thicknesses of the workpieces, and the distance between the head 31 and the breaking part 36 is also different when corresponding to different thicknesses of workpieces, which does not cause the problem that the breaking part 36 protrudes too much or sinks into the collar 40.

Figure 11:
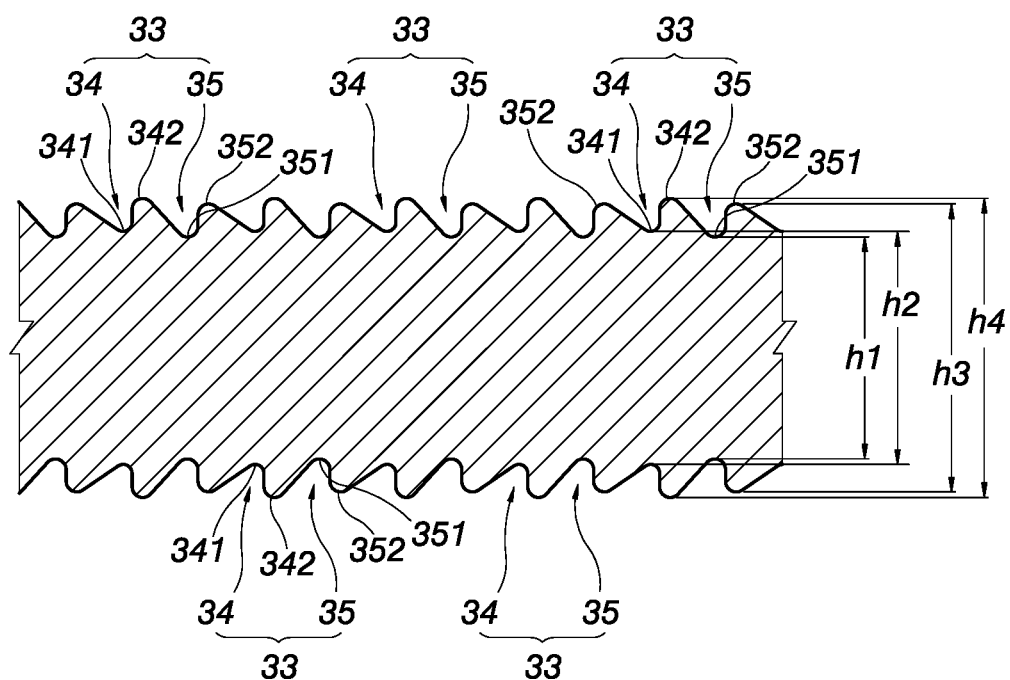
FIG. 11 is an enlarged cross-section view of a pin of a second embodiment of the disclosure.

With reference to FIG. 11, a second embodiment of the disclosure is different from the first embodiment in that a diameter h3 of the second groove peak 352 is smaller than a diameter h4 of the first groove peak 342, so that any set of ring grooves 33 of the plurality of sets of ring grooves 33 form a structural strong point and a structural weak point, and hence form an interval arrangement of structural strong points and structural weak points on the entire body 32, causing each of the structural weak points arranged at intervals to be a breaking part 36 during the break-off operation. The diameter h3 and the diameter h4 may be a difference in size that may be recognized by the naked eye, or a size difference that is unintentionally observed by the naked eye, such as a difference of 0.3 mm to 0.03 mm to 0.03 mm, and the foregoing difference values in size are for illustration purposes only and are not intended to limit the disclosure.

Figure 12:
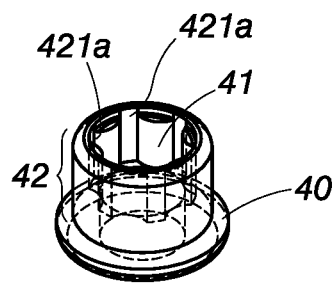
FIG. 12 is a perspective view of a collar of a third embodiment of the disclosure.
Figure 13:
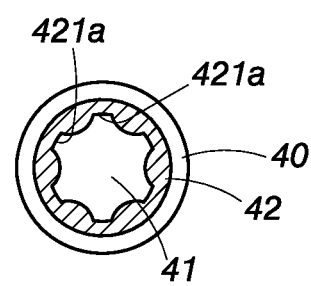
FIG. 13 is a cross-section view of a collar of a third embodiment of the disclosure.

With reference to FIGS. 12 and 13, a structure of a collar 40 of a third embodiment of the disclosure is illustrated. The recess portion 421 of the present embodiment is provided on an inner wall of the collar 40, and has a plurality of recess portions 421a, wherein the cross section of the through-hole 41 has a radial shape instead of a circular shape, and the setting of the plurality of recess portions 421a is used to reduce the deformation resistance of the collar 40.

Figure 14:
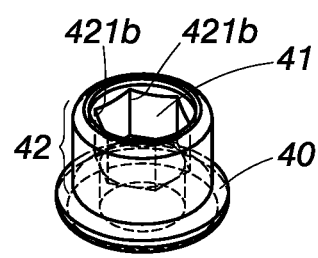
FIG. 14 is a perspective view of a collar of a fourth embodiment of the disclosure.
Figure 15:
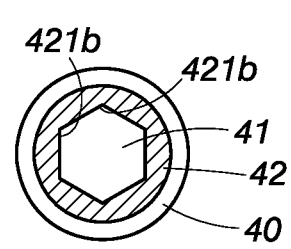
FIG. 15 is a cross-section view of a collar of a fourth embodiment of the disclosure.

With reference to FIGS. 14 and 15, a structure of a collar 40 of a fourth embodiment of the disclosure is illustrated. The recess portion 421 of the present embodiment is provided on an inner wall of the collar 40, and has a plurality of recess portions 421b, wherein the cross section of the through-hole 41 has a radial shape instead of a polygonal shape, and the setting of the plurality of recess portions 421b is used to reduce the deformation resistance of the collar 40.

The above description is only an example to illustrate the possible preferred embodiments of the disclosure, and the scope of implementation of the disclosure cannot be limited thereby.

What is claimed is:

1. A reduced ring groove rivet, comprising:
a pin having a head and a body connected to the head,
a plurality of sets of ring grooves being equidistantly arranged on the body, each of the sets of ring grooves including a first ring groove and a second ring groove adjacent to the first ring groove, wherein the first ring groove has a first groove bottom and a first groove peak adjacent to the first groove bottom, and the second ring groove has a second groove bottom and a second groove peak adjacent to the second groove bottom;
a diameter of the second groove bottom is smaller than a diameter of the first groove bottom, all of the diameter of the first groove bottom of the plurality of ring groove are the same, and all of the diameter of the second groove bottom of the plurality of ring groove are the same, so that any of the plurality of sets of ring grooves may be selected as a breaking part during the break-off operation.

2. The reduced ring groove rivet according to claim 1, further comprising a collar, wherein the collar is provided with a through-hole to be sleeved on the body, the collar has a hardness smaller than the pin and has an engagement region, and the engagement region is protruded into each of the sets of ring grooves adjacent to its position after being deformed to engage the body.

3. The reduced ring groove rivet according to claim 2, wherein the engagement region is provided with a recess portion, and the recess portion is arranged on an outer wall of the collar in a ring shape.

4. The reduced ring groove rivet according to claim 2, wherein the engagement region is provided with a plurality of recess portions, and the plurality of recess portions is arranged on an inner wall of the collar.

5. The reduced ring groove rivet according to claim 2, wherein the pin and the collar comprise austenitic stainless steel.

6. The reduced ring groove rivet according to claim 1, wherein a diameter of the second groove peak is smaller than a diameter of the first groove peak.

7. The reduced ring groove rivet according to claim 6, further comprising a collar, wherein the collar is provided with a through-hole to be sleeved on the body, the collar has a hardness smaller than the pin and has an engagement region, and the engagement region is protruded into each of the sets of ring grooves adjacent to its position after being deformed to engage the body.

8. The reduced ring groove rivet according to claim 7, wherein the engagement region is provided with a recess portion, and the recess portion is arranged on an outer wall of the collar in a ring shape.

9. The reduced ring groove rivet according to claim 7, wherein the engagement region is provided with a plurality of recess portions, and the plurality of recess portions is arranged on an inner wall of the collar.

10. The reduced ring groove rivet according to claim 7, wherein the pin and the collar comprise austenitic stainless steel.

* * * * *